United States Patent Office 3,676,187
Patented July 11, 1972

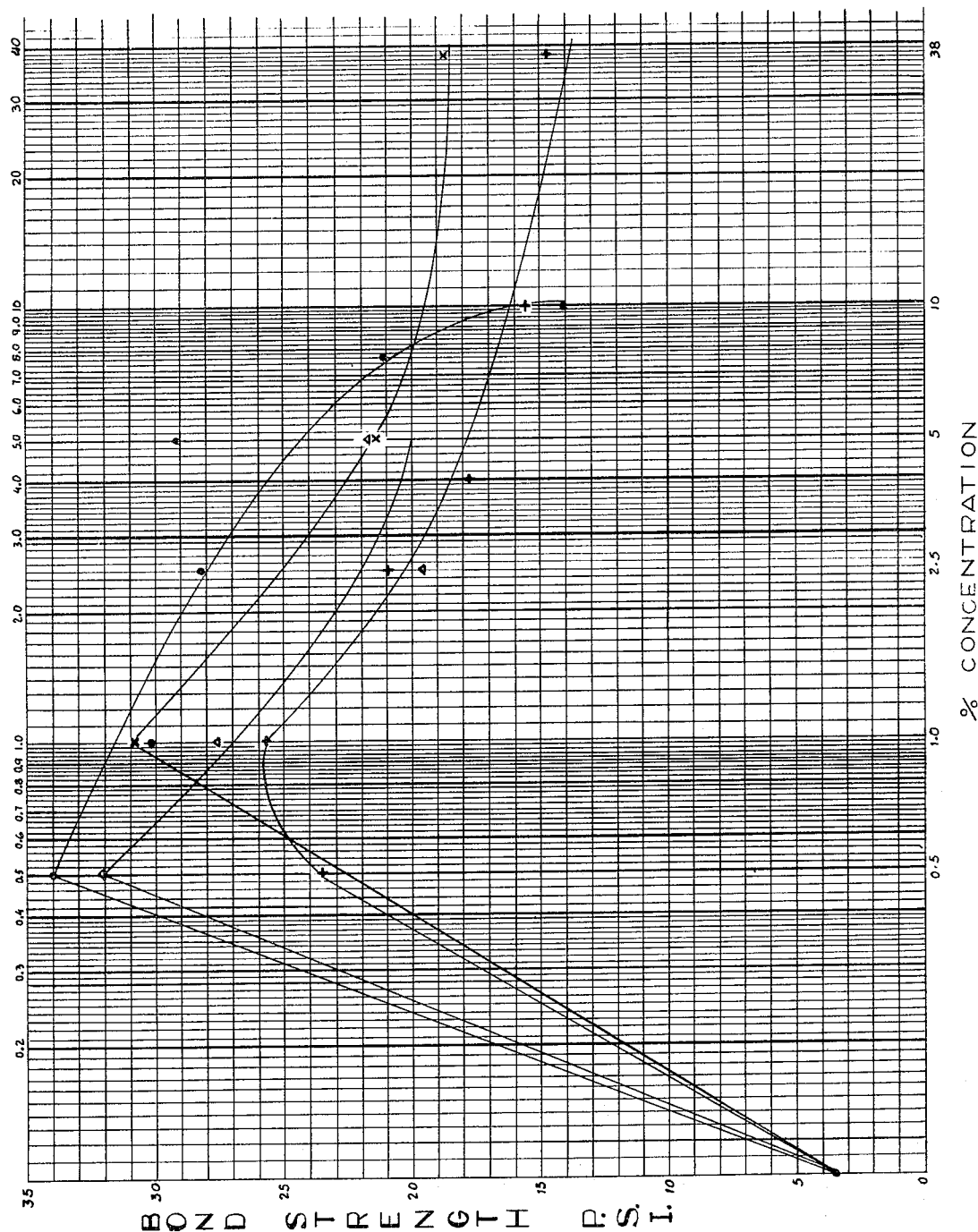

3,676,187
BRICK TREATMENT
Leo Kampf, 39—67 48th St., Sunnyside, N.Y. 11104
Filed May 18, 1970, Ser. No. 38,386
Int. Cl. B44d 1/02
U.S. Cl. 117—70 A                    8 Claims

ABSTRACT OF THE DISCLOSURE

The application to the mortar surface of brick of a water repellant material at a concentration in the range of about 0.5% to less than 5%, with a preferred concentration of 1%.

BACKGROUND OF THE INVENTION

The invention involves increasing the bond between brick and mortar.

The prior art includes the following United States patents as known to the applicant:

2,650,173, Goulding, Jr., Aug. 25, 1963; 2,657,153, Russell, Oct. 27, 1953; 2,683,674, Hatcher et al., July 13, 1954.

A discussion of mortar to brick bonds is contained in an article by the applicant entitled "Factors Affecting Bond of Mortar to Brick" published by the American Society for Testing and Materials in 1962 as Special Technical Publication No. 3201, pages 127–142.

The bond between motar and brick is achieved by the flow of the mortar into the voids and interstices of the brick and bonding therewithin. The bond is reduced in accordance with the reduction of the flow of mortar into the surface contours of the brick. The surface characteristics of the brick are therefore of paramount importance in determining the strength of the bond. A dense brick such as a high temperature burned brick (high or hard burned) has a lower suction rate of water than does a less dense more porous brick such as a low temperature burned brick (low or soft burned).

Distinction must be drawn between absorption of water by the brick and suction of the water into the brick. Brick contains two general types of voids: very small microvoids and larger macro-voids. The micro-voids act as capillaries and draw water quickly and by capillary or sucking action. Absorption is the flow of water into the macro-voids.

Absorption may be measured by a standard test described in ASTM C 67. Brick is immersed in water for twenty-four hours and the amount or percentage of water absorbed is measured. A modification of the test to determine the efficacy of waterproofing compounds involves immersion of the brick for four hours in ¼" of water. There is little difference between these two tests in terms of comparative results. The modified test more closely simulates the effect of rain and the results are usually expressed as a percentage of the dried weight of the brick.

A second test is defined in the same publication and is entitled "Initial Rate of Absorption (Suction)." The test involves the immersion of brick in ⅛" of water for one minute. The results are expressed as grams of water absorbed per thirty square inches of flat surface.

The applicant has found that there is no apparent connection between the absorption and suction rates of brick.

The following table shows the result of tests which applicant has performed on various types of brick which demonstrate that suction and absorption rates are not necessarily related:

TABLE I

| Suction (⅛" water, 1 minute) grams 30 sq. in. | Absorption (¼" water, 4 hours) | |
|---|---|---|
| | Grams per 30 sq. in. | Percent of brick weight |
| 45.5 | 196.3 | 10.2 |
| 45.5 | 151.8 | 7.6 |
| 44.3 | 306.8 | 16.6 |
| 39.2 | 177.0 | 9.0 |
| 35.2 | 175.0 | 10.0 |
| 33.8 | 352.8 | 19.5 |
| 23.1 | 163.8 | 8.6 |

Applicant has determined that it is the suction rate and not the absorption rate which more closely affects the adhesion of the mortar to brick. The article cited discusses this point. As noted previously, the bond is created by the mortar flow into the surface aberations of the brick. This flow is important and occurs within the first minute or so after the mortar is applied to the brick. The flow of mortar obviously requires a relatively low viscosity mortar, one which flows very readily. But if the suction rate of the brick is high, mortar water is immediately drawn from the motar into the brick thereby stiffening the mortar, reducing its flowability, limiting the flow into the brick and reducing the resulting bond.

SUMMARY OF THE INVENTION

The present invention contemplates a means for reducing the suction of water into the brick without materially affecting the absorption of water.

Briefly, and not by way of limitation, the present invention provides for the application to the mortar surface of brick of a water repellant material at a concentration which is sufficient to reduce the suction rate but insufficient to materially reduce the absorption rate. As will be seen from a consideration of the results of tests discussed hereinbelow, the concentration range of water repellant material which is suitable runs from about 0.5% to less than 5%; the most suitable concentration is approximately 1%.

BRIEF DESCRIPTION OF THE DRAWING

The drawing is a plotting of the experimental results of tests which applicant has performed using four common waterproofing compounds at various concentrations and determining the resulting mortar to brick bond strength. The bond strength is shown in pounds per square inch and the concentration percentages are plotted logarithmically.

DESCRIPTION OF PREFERRED EMBODIMENTS OF THE INVENTION

The invention provides for the application standard water repellant materials to the surface of brick before mortar is applied to the treated surface. The material should be applied in sufficient concentrations to fill the microvoids in the surface of the brick but insufficient to fill the macro-voids therein.

Waterproofing compounds which have been found to be entirely suitable for use in connection with the present invention include wax solutions, wax emulsions, aluminum stearate solutions, aluminum stearate emulsions, stearic acid solutions, butyl silicone, ethyl silicone, General Electric 103 silicone and General Electric SC 50 silicone. Any water repellant material which will reduce the suction rate will increase the bond strength, provided that the absorption rate and mortar flow are not obstructed. To be effective in reducing the suction rate and thereby increasing the bond strength, a material need not be a good waterproofer. For example, the waxes and stearates are perhaps the least effective waterproofers but are more effective in connection with the application of the present invention. Conversely, a material which is an effective waterproofer may impede the flow of mortar in addition to the flow of water and therefore will reduce rather than increase the mortar to brick bond strength. An example of the latter material is butyl siloxanol at waterproofing concentrations such as the 38.1% solids content contemplated in the Hatcher patent above referred to, column 3, line 40, see Table III below. At poor waterproofing concentrations such as 1% the same material is effective in increasing mortar to brick strength, see Table II below.

Applicant has performed tests with various types of waterproofing compounds to determine the effects of those compounds on the suction rate, the absorption rate and on the resulting mortar to brick bond strength. The tests were performed in a manner similar to that described in the Hatcher patent above mentioned, at column 2 line 41 et seq. Approximately 10 grams of each solution was brushed on one flat side and four edges of each brick. The solutions applied were 1% of the indicated waterproofing compound diluted with mineral spirits (paint thinner) except where the water solution is indicated. The bond strength test was made in accordance with ASTM E 149. Table II shows the results of the tests.

TABLE II

| Compound (10-gms. on 5 surfaces, 1% solution or emulsion) | Suction (⅛" water, 1 min.) gms. per 30 sq. in. | | Absorption (¼" water, 4 hrs.) gms. (percent) | | Bond strength (p.s.i.) |
| --- | --- | --- | --- | --- | --- |
| | Original | Treated | Original | Treated | |
| None | 38.8 | | 170 (9.0) | | 2.8 |
| Wax solution | 32.0 | 5.9 | 197 (10.0) | 193 (9.9) | 29.2 |
| Wax emulsion | 32.0 | 2.4 | 197 (10.0) | 166 (8.5) | 31.2 |
| Aluminum stearate solution | 31.5 | 1.5 | 171 (8.9) | 151 (7.8) | 27.3 |
| Aluminum stearate emulsion | 36.0 | 4.5 | 175 (9.0) | 156 (8.0) | 24.9 |
| Stearic acid solution | 31.3 | 4.3 | 171 (8.7) | 168 (8.5) | 14.8 |
| Butyl siloxyanol | 39.7 | 0.1 | 257 (13.8) | 54 (5.8) | 30.9 |
| Ethyl siloxanol | 30.9 | 0.6 | 176 (9.6) | 153 (8.4) | 34.9 |
| General Electric 103 silicone | 42.5 | 0.9 | 309 (15.7) | 151 (7.7) | 25.6 |
| General Electric SC 50* | 32 | 1.0 | 168 (8.7) | 47 (2.4) | 11.9 |

*Water solution of sodium methyl siliconate.

Other tests were made using butyl siloxanol and ethyl siloxanol prepared in the manner set forth in the Hatcher patent at column 3 lines 16–40. The absorption tests were performed in the manner which the Hatcher patent describes. The results of these tests are shown in Table III.

TABLE III

| Compound | Suction (gms./30 sq. in.) | | Absorption (percent) | | Bond strength (p.s.i.) |
| --- | --- | --- | --- | --- | --- |
| | Original | Treated | Original | Treated | |
| Butyl siloxanol | 35.6 | 0.3 | 9.5 | 0.5 | 18.7 |
| Ethyl siloxanol | 32.9 | 0.3 | 8.8 | 4.4 | 31.7 |

It is clear that the results shown in Table III that butyl siloxanol is more effective than ethyl siloxanol insofar as waterproofing characteristics are concerned (compare the absorption rates of the treated brick). It is equally clear, however, that butyl siloxanol is no more effective than ethyl siloxanol in reducing the suction rate (compare suction rates for treated brick) and is less effective in increasing the mortar to brick bond strength at the 38.1% concentration used.

The effect of concentration of particular water-proofing compounds on suction rate and bond strength has been determined by applicant through a series of tests, the results of which are shown in Table IV which follows and in the drawing. The results are plotted in the drawing by way of cross marks to indicate the butyl siloxanol tests, by plus marks to indicate the General Electric silicone number 103 tests, by dots to indicate the paraffin wax tests, and by triangles to indicate the aluminum stearate tests. The curves in the drawing are approximations of the test results.

TABLE IV

| Concentration (Percent) | Suction rate | | Bond strength (p.s.i.) |
| --- | --- | --- | --- |
| | Original | Treated | |
| Butyl siloxanol | | | |
| 38.1 | 35.6 | 0.3 | 18.7 |
| 5.0 | 39.2 | 0.4 | 21.5 |
| 1.0 | 29.7 | 0.1 | 30.9 |
| Ethyl siloxanol | | | |
| 38.1 | 32.9 | 0.3 | 31.7 |
| 1.0 | 20.9 | 0.6 | 34.9 |
| General Electric silicone Number 103 | | | |
| 38.1 | 42.2 | 0.9 | 14.9 |
| 10.0 | 45.0 | 1.5 | 15.8 |
| 5.0 | 38.4 | 1.1 | 17.8 |
| 2.5 | 47.2 | 1.1 | 21.0 |
| 1.0 | 42.5 | 0.9 | 25.6 |
| 0.5 | 33.8 | 0.7 | 23.5 |
| Paraffin wax (melting point 56–58° C.) | | | |
| 10.0 | 53.1 | 0.1 | 14.2 |
| 7.5 | 38.8 | 0.1 | 21.1 |
| 5.0 | 47.5 | 0.1 | 29.1 |
| 2.5 | 32 | 0.8 | 28.1 |
| 1.0 | 32 | 4.2 | 30.2 |
| 0.5 | 31.6 | 1.4 | 33.9 |
| Aluminum stearate | | | |
| 5.0 | 40.6 | 1.5 | 21.7 |
| 2.5 | 44.2 | 1.2 | 19.6 |
| 1.0 | 33.1 | 0.9 | 27.6 |
| 0.5 | 21.1 | 0.1 | 32.0 |

It will be noted from Table IV and the plot thereof in the drawing that optimum bond strengths are achieved at a concentration rate of approximately 1%. It will also be seen that bond strengths in excess of 20 to 25 p.s.i. are achieved at concentration rates which begin at approximately 0.5% and run up to somewhat less than 5%. Accordingly, a preferred concentration is 1% but desirable and allowable concentration rates run from 0.5% to less than 5%.

It has been noted above that the suction rate of soft-burned brick is greater than the suction rate of hard-burned brick. Reduction of the suction rate of soft-burned brick to equal that of hard-burned brick should be at a cost which is lower than the cost differential between the bricks themselves. Obviously, if the costs of reducing the suction rate of soft-burned brick to that of hard-burned brick by application of water repellant compounds is greater than the initial cost premium of hard-burned brick over soft-burned brick, then it is economically more practical to use hard-burned brick in the first place.

An important element in the cost of reducing soft brick suction rates is the concentration of waterproofing compound used. Also important is the nature of the solvent which is utilized. Mineral spirits, for example, are less costly than toluene. Mineral spirits may be used with General Electric 103 silicone and all other water repellant materials other than butyl silicone and ethyl silicone which require toluene as a solvent. General Electric SC 50 and the emulsions can utilize water as a solvent with the additional advantage of no fire hazard.

While the foregoing is illustrative of preferred embodiments of the invention it should be noted that other embodiments may be had within the teachings hereof. For example, application of the waterproofing compound discussed at the concentration desired may be by any suitable method, such as by brush, spray, dip or rollers.

There are advantages of the present invention which go beyond structural desirability of having an increased mortar to brick bond. For example, passage of water through a brick wall usually occurs between the mortar and the brick rather than through the mortar or through the brick. Accordingly, an increase in the mortar to brick bond will reduce the passage of water, such as rain water, an obviously desirable advantage. The wall will also be more durable in that there will be a reduction in the amount of water which is permitted to come between the mortar and the brick thereby reducing damage to the wall from freezing. Many of the advantages of reducing the passage of water through masonry walls were recognized by Cyrus Fishburn of the National Bureau of Standards in report BMS 82, "Water Permeability of Walls Built of Masonry Units" 1942. In particular, the following is taken from page 34 of that report: "The data . . . show that the 'suction' of the bricks rather than their total absorptive capacity when dry, was a principal factor affecting wall permeability . . ."

An additional advantage of reducing the suction rate of brick is a reduction of the rate at which the mortar will stiffen permitting a mason to place a longer bed of mortar before setting the brick and tooling the joints.

What is claimed is:

1. A method for increasing the bond between mortar and brick, comprising the steps of:
    (a) treating the surface of the brick with a water repellant material solution sufficient to fill the microvoids of the brick to prevent suction of water thereby and insufficient ot fill the macro-voids of the brick, permitting absorption of water thereby, having a concentration of from about 0.5% to less than 5%; and
    (b) applying mortar to the treated brick surface.

2. A method for increasing the bond between mortar and brick in accordance with claim 1, wherein:
    the water repellant material solution has a concentration of 1%.

3. A method for increasing the bond between mortar and brick, in accordance with claim 1, wherein:
    the water repellant material is ethyl siloxanol.

4. A method for increasing the bond between mortar and brick, in accordance with claim 1, wherein:
    the water repellant material is aluminum stearate.

5. A method for increasing the bond between mortar and brick, in accordance with claim 1, wherein:
    the water repellant material comprises silicone.

6. A method for increasing the bond between mortar and brick, in accordance with claim 2, wherein:
    the water repellant material is ethyl siloxanol.

7. A method for increasing the bond between mortar and brick, in accordance with claim 2, wherein:
    the water repellant material is aluminum stearate.

8. A method for increasing the bond between mortar and brick, in accordance with claim 2, wherein:
    the water repellant material comprises silicone.

References Cited
UNITED STATES PATENTS

| | | | |
|---|---|---|---|
| 2,683,674 | 7/1954 | Hatcher et al. | 117—123 |
| 3,058,936 | 10/1962 | Leclercq et al. | 117—123 X |
| 2,757,159 | 7/1956 | Hormats | 117—123 X |
| 2,927,909 | 3/1960 | Lyons et al. | 117—123 X |
| 2,574,168 | 11/1951 | Brick | 117—123 |
| 2,738,291 | 3/1956 | Williams | 117—70 |

RALPH S. KENDALL, Primary Examiner

C. WESTON, Assistant Examiner

U.S. Cl. X.R.

117—70 R, 123 R, 123 D, 135.5